Figure 2B:
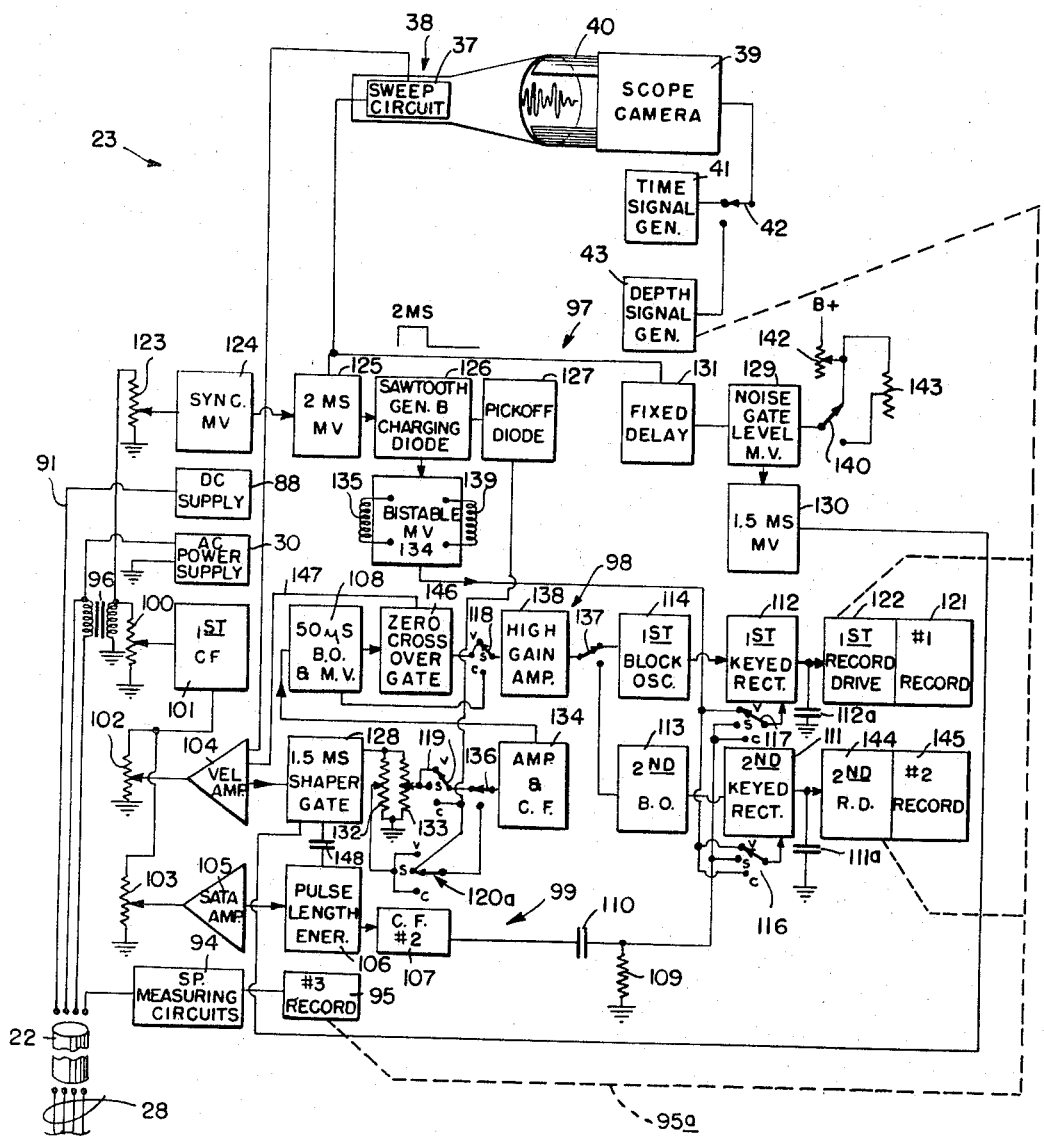

Aug. 1, 1967 L. FONS ETAL 3,334,329
METHOD AND APPARATUS FOR PRODUCING A PLURALITY OF
CURVES FOR COMPARISON IN ACOUSTIC WELL LOGGING
Filed May 6, 1964 2 Sheets-Sheet 1
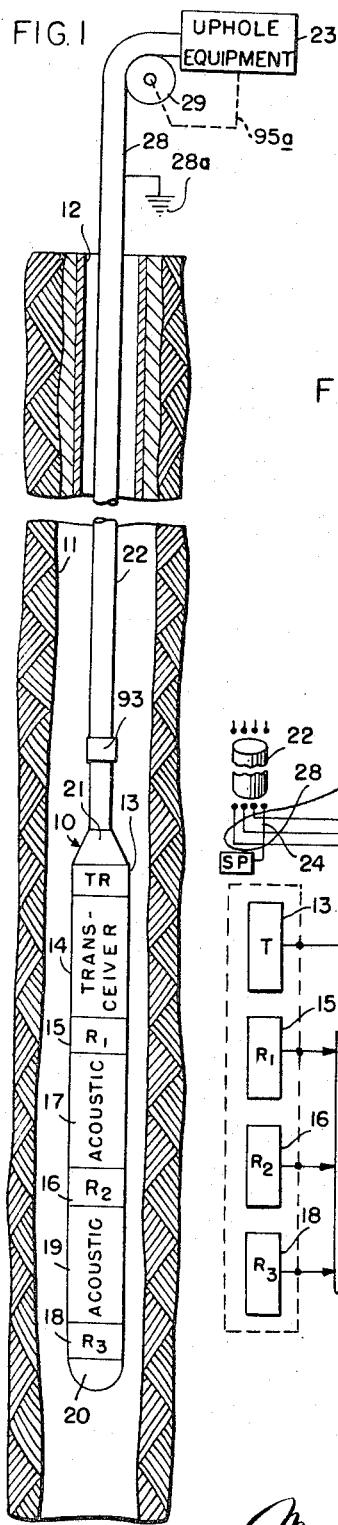
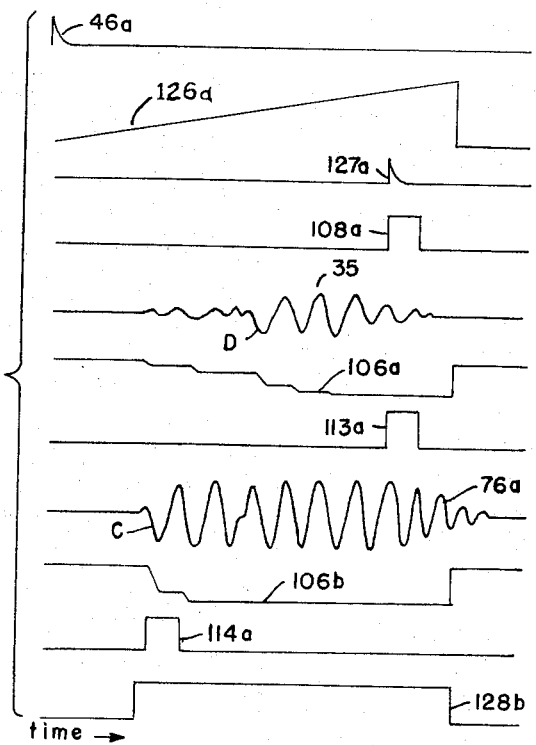
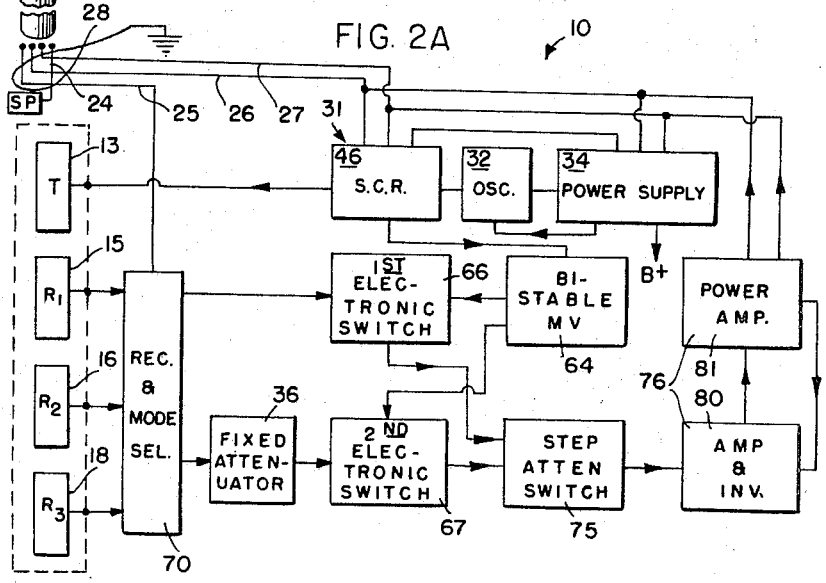
INVENTORS:
LLOYD FONS
EDWARD B. TICKELL, JR.
Mason, Kolehmainen, Rathburn & Wyss
ATT'YS

INVENTORS:
LLOYD FONS
EDWARD B. TICKELL, JR.

Mason, Kolehmainen, Rathburn & Wyss
ATT'YS 3,334,329
METHOD AND APPARATUS FOR PRODUCING A PLURALITY OF CURVES FOR COMPARISON IN ACOUSTIC WELL LOGGING
Lloyd Fons, Oklahoma City, Okla., and Edward B. Tickell, Jr., Houston, Tex., assignors to Pan Geo Atlas Corporation, Houston, Tex., a corporation of Delaware
Filed May 6, 1964, Ser. No. 365,474
7 Claims. (Cl. 340—18)

This invention relates generally to a new and improved method and apparatus for acoustic logging and is more particularly concerned with new and useful improvements in recording and analyzing information obtained from well logging systems of the type wherein acoustic energy in the form of spaced apart pulses is transmitted from a transmitting source through the casings or formations adjacent a well bore to one or more receiving points spaced a fixed distance from the source.

In the logging of borehole formations by means of acoustic energy passing through the formations, there are several different types of information that may be useful. For example, one type of log that has been used extensively is a conventional velocity log in which the travel times of pulses from the transmitter to a spaced receiver are measured at different borehole depths. Since the spacing is constant any variations in the measured travel times can be attributed to the varying velocities of propagation of the different formations. Such logs have been produced either using a single receiver or using a pair of spaced receivers and measuring the difference between the travel time of the acoustic pulse to the far receiver and the travel time to the near receiver. The two receiver logs possess advantages which are well known in the art. Velocity logs are generally developed by utilizing only the energy initially arriving at the receiver or receivers following such transmitter pulse and all subsequently arriving energy is discarded or ignored.

Other logs, conventionally called amplitude or attenuation logs, are produced by measuring the amplitude of the acoustic pulses arriving at a receiver spaced from the pulse source. Generally, amplitude or attenuation logs are produced by measuring the amplitude of a given cycle or half cycle of arriving energy while disregarding all of the remaining information present in the signals arriving at the receiver or receivers. Usually the first cycle or compressional wave is measured to obtain the amplitude or attenuation log.

It is an object of the present invention to provide a method and apparatus utilizing the full signal train arriving at one or more downhole receivers to furnish a wide variety of information useful in analyzing the subsurface formations.

A further object of the present invention is to provide a method and apparatus for providing useful information by recording simultaneously the amplitude of the compressional wave or initially arriving signal at the downhole receiver and the maximum amplitude of the waves making up the total train of energy arriving at the receiver following the transmitter pulse.

Another object of the invention is to provide a method and apparatus for obtaining useful information by recording the total train of energy arriving at a downhole receiver and thereafter analyzing that train in detail to extract a variety of different parameters.

It has recently been found that the train of energy arriving at each receiver after the transmitter pulse contains a vast amount of useful information which may be helpful in analyzing or determining the character of the subsurface earth formations. In U.S. Patent No. 3,093,810 a system is disclosed for recording the entire train of energy in variable density form to facilitate the analysis. A variable density record is useful primarily for depicting in convenient form variations in amplitude but, since it operates on a black-gray-white basis, small amplitude variations, which may be highly significant, are difficult, if not impossible, to discern. Moreover, a variable density record does not portray important characteristics such as changes in wave shape and, in addition, parameters, such as frequency or period of the recorded energy, are difficult to determine. An ordinary oscillographic record displays the energy in a form permitting measurement of all of these parameters. An earlier U.S. Patent No. 2,708,485 discloses a system wherein the energy arriving at the receiver is recorded in oscillographic form but only the initially arriving energy is used to provide the travel time or velocity information, the remaining signals being disregarded.

The foregoing and other objects are realized, in accordance with the present invention, by providing an acoustic logging system including a downhole tool connected via a multiple conductor cable to surface measuring and recording equipment. The downhole tool carries a transmitting transducer and three detectors or receiving transducers all oriented in fixed, spaced apart position.

The downhole tool further comprises a receiver-switching circuit controlled from the surface equipment for rendering different ones of the detectors effective. This switching circuit is so constructed and arranged that any one of the detectors may be connected individually to the amplifying circuits of the downhole tool or, in the alternative, the detectors may be rendered effective in different pairs to permit the running of two receiver logs with three different spacings. The downhole amplifying circuits are connected through the multiconductor cable to the surface recording and measuring equipment which also receives a synchronizing pulse from the transmitter pulsing circuit. The surface equipment may be rendered selectively effective to provide any one of three different type logs in response to the synchronizing pulses and to the acoustic waves arriving at one or more of the detectors as the downhole tool is moved through the borehole. The first such log is a conventional, two receiver, velocity curve recorded by rendering two of the downhole detectors effective and by measuring the travel time of the acoustic wave through the spacing between the two detectors. This is accomplished by obtaining a first signal representing the travel time from the acoustic wave source to the far detector, obtaining a second signal representing the travel time from the source to the near receiver and subtracting the two signals. As was indicated above, three different spacings of the two effective detectors may be obtained by operation of the downhole receiver switching circuit. The second log is a cement bond log of the type described in U.S. application Ser. No. 181,859, filed Mar. 23, 1962, by Gerald C. Summers and assigned to the same assignee as the present application, now U.S. Patent No. 3,295,628 and is recorded by rendering only one of the downhole receivers effective. As is described in detail in the latter application, the cement bond log comprises a conventional, single receiver velocity curve representing the travel time of the acoustic wave to the effective detector and recorded simultaneously with an amplitude curve representing the amplitude of the acoustic energy arriving at that detector. Again, three different effective spacings of the detector from the source can be obtained by operation of the receiver switching circuit. The third log is called a "Satalog," a trademark of the Pan Geo Atlas Corporation, the assignee of the present application, and is recorded with two downhole detectors effective. As is described in detail in application Ser. No.

846,974, filed Oct. 16, 1959 by Charles H. Thurber et al. and assigned to the same assignee as the present application, this log comprises a first single receiver amplitude curve representing the amplitude of the acoustic waves arriving at one of the two effective detectors and recorded simultaneously with a second curve representing the difference in amplitude between the acoustic waves arriving at the two effective detectors. Here again, the three different effective spacings of the two active detectors can be obtained by operation of the receiver switching circuit.

When the receiver selector switch is connected to render only one of the downhole receivers effective and when the system is conditioned to provide a velocity log or curve, a pair of recorders may be employed in the surface equipment for respectively recording the amplitude of the compressional wave or initially arriving energy and the maximum amplitude of the energy train arriving at the effective receiver. The recorders may be separate recording galvanometers of a single recording device. Moreover, if desired, the train of energy arriving at the effective recording receiver may be supplied via the cable to an oscilloscope in the surface equipment and a camera may be employed to take pictures of the screen or face of the oscilloscope. The camera may be periodically operated from a timing source to take pictures at uniformly spaced time intervals or, alternatively, the camera may be operated in synchronism with the mechanism for paying out and reeling the cable so that pictures are taken with the downhole tool disposed at predetermined depths in the borehole. The pictures may be analyzed to extract such information as the peak amplitude of the compressional wave, the maximum amplitude of the total signal train, the frequency or period of the received signal, the velocity of propagation, the persistence of the signal, the total energy contained in the train of signals and the like.

The invention, both as to its organization and manner of operation, together with further objects and advantages, will best be understood by reference to the following detailed description taken in conjunction with the accompanying drawings wherein:

FIG. 1 is a diagrammatic view illustrating a fragmentary portion of the earth's crust with a borehole therein and including a downhole tool and the uphole or surface equipment;

FIGS. 2A and 2B, taken together, are schematic diagrams primarily in block form with FIG. 2B showing surface equipment and FIG. 2A showing a downhole tool both characterized by the features of the present invention, and FIG. 3 depicts a number of typical waveforms useful in explaining the operation of the system shown in FIGS. 1 and 2.

Referring now to the drawings and first to FIG. 1 a well logging system characterized by the features of the present invention is there shown as comprising a downhole tool 10 disposed within a borehole 11 extending into the earth from the surface. While the tool 10 may be used in logging either a completely cased well or an open hole, the upper portion of the borehole 11 is illustrated in FIG. 1 as being cased by a plurality of casing sections 12 secured together in end to end relationship as, for example, by threading one end of each section into the adjacent section. The lower portion of the borehole 11 is illustrated as being an open hole and may contain the usual borehole fluid.

The downhole tool 10 comprises a transmitting transducer or transmitter 13, a transceiver section 14 housing the electronic components of the downhole tool, a first receiving transducer or detector 15, a second receiving transducer or detector 16, an acoustic isolating section 17 which spaces and electrically insulates the detectors 15 and 16, a third receiving transducer or detector 18 and another acoustic insulating section 19 for spacing and electrically insulating the detectors 16 and 18. The downhole tool further comprises a nose piece 20 at the bottom and a cable connector 21 at the top which is secured to a multiple conductor cable 22 extending through the borehole to the surface. The sections of the downhole tool may be housed within generally cylindrical casings provided with threaded couplings (not shown) at both ends and these casings are secured together end to end in well known manner. Suitable electrical connectors are provided between the different sections but these are conventional and, hence, are not shown in the drawings.

The cable 22 may include any number of conductors necessary to provide the desired electrical connections between the downhole tool and the surface equipment identified by the reference numeral 23 in FIG. 1 but in the form shown a cable is employed having four inner conductors 24, 25, 26 and 27 (FIG. 2) insulated from each other and housed within an outer conducting sheath 28. The outer sheath is grounded both in the downhole tool 10 and, as indicated at 28a, at the surface equipment to provide a common ground connection. At the surface the cable 22 is trained over a motor driven sheath 29 which forms part of a suitable means cooperating with the cable to raise or lower the downhole tool 10 within the borehole.

Power for the electric circuits of the downhole tool is supplied from a conventional 60-cycle AC power source 30 in the surface equipment via one of the cable conductors, for example, the conductor 26, or conductors 26 and 27 if phantoming is desired, the return connection, of course, being provided by the grounded outer sheath 28. The power is delivered to the downhole tool by a phantoming circuit similar to that described briefly in the above-identified copending application Ser. No. 846,974 but described more fully below.

As is shown in FIG. 2 the transmitting portion of the system includes, in addition to the transmitting transducer 13 referred to above, a pulsing circuit 31 which is a synchronized, low voltage high current source described and claimed in copending application Ser. No. 310,684, filed Sept. 23, 1963 by Lyman Edwards et al. and assigned to the same assignee as the present invention now U.S. Patent No. 3,303,461. The transmitting transducer 13 is pulsed by the pulsing circuit 31 to emit pulses at a suitable repetition rate, for example, at a rate of about 15 to 30 pulses per second. In the ensuing description, a repetition rate of 15 pulses per second will be assumed thus providing a period of 66.6 milliseconds between successive pulses. Even with the maximum spacing of the receiver from the transmitting transducer 13 all of the acoustic energy necessary for the production of the velocity and amplitude curves will arrive at the detector within an interval of a few milliseconds following the emission of the acoustic pulse from the transmitting source. As a consequence, the velocity and amplitude measurements are made during the first milliseconds of each period so that these first few milliseconds may be referred to as the measuring interval of each cycle. The transmitting transducer 13 and its associated pulsing circuit 31 comprise a means for generating a series of spaced apart acoustic or elastic pulses coupled by the borehole fluid to the borehole formations or to the casing sections 12.

The pulsing circuit 31 includes a relaxation oscillator 32 comprising a unijunction transistor having its operating potential supplied from a low voltage power supply 34. The low voltage power supply is energized by AC power supplied from the source 30 via the cable conductor 26. The firing of the transducer is triggered by a silicon controlled rectifier 46 which is rendered conductive by application to its control electrode of an excitation pulse from the relaxation oscillator 32.

The signal appearing across the silicon controlled rectifier 46 is used as a synchronizing pulse to correlate the timing of the remaining circuit components in the downhole tool and in the surface equipment 23 with the operation of the transmitting transducer 13. This synchronizing pulse, which is represented by the spike 46a in FIG. 3 and appears between the conductors 26 and 27, is applied to the surface equipment to perform a timing function described more fully hereinafter. One synchronizing pulse is obviously developed each time that the transmitting transducer fires.

A switching circuit, consisting of a bi-stable multivibrator 64 and a pair of electronic switches 66 and 67, provides two alternately operated receiver channels in the downhole tool. These circuits are described in some detail in the above-identified copending application Ser. No. 310,684, now Patent No. 3,303,461 to which reference may be taken for a complete explanation if necessary. Each synchronizing pulse is effective to drive the bi-stable multivibrator 64 from one conducting condition to the other. The bi-stable multivibrator controls the pair of electronic switches 66 and 67 which are, in turn, effective to control the condition of a pair of receiving channels. The electronic switches 66 and 67 are of conventional construction and are so connected to the bi-stable multivibrators 64 that the electronic switch 66 is conducting when the multivibrator is in one of its two conditions while the electronic switch 67 is conducting when the multivibrator is in the other of its conducting conditions. Thus, each of the switches 66 and 67 conducts during alternate cycles. The signal input to the electronic switches 66 and 67 is applied through remotely controlled stepping switch 70 which forms part of a receiver switching system also described in detail in the copending application Ser. No. 310,684 now U.S. Patent 3,303,461. As is there explained the first three positions of the switch 70 may be referred to as the two receiver positions because when the switch is in any one of these three positions a first receiver is connected to one of the electronic switches 66 or 67 while a second and different receiver is connected to the other electronic switch. These three positions are used when running a two receiver velocity log and also when running a "Satalog." The three switch positions permit the operator to change the effective spacing of the two active receivers. The last three positions of the switch 70 may be referred to as the single receiver positions because when the switch is in each of these three positions the same receiver is connected to both electronic switches. These three positions are used during running of the cement bond log and also permit changing of the effective spacing between the source and the active receiver. For a purpose which will become apparent as the description proceeds the input to one of the electronic switches, for example, the switch 67 is applied through a fixed attenuator circuit 36 which reduces the signal amplitude to a predetermined submultiple of the amplitude of the input signal to the electronic switch 66. The electronic switches 66 and 67 when rendered conductive by the bi-stable multivibrator 64 are effective to supply drive signals from the active receiving transducers to a step attenuation switch indicated generally by the reference numeral 75 which controls the gain of an amplifier circuit 76 for transmitting the detected signals to the surface equipment. A typical train of detected signals is represented by the waveform 76a in FIG. 3 where the compressional wave or first arrival is identified by the letter C. The amplifier 76 comprises an input amplifier and phase inverter stage 80 and a conventional power amplifier 81. The gain of the amplifier 76 is set by the circuit 75 to a high level or more specifically, at a level where the amplifier is driven just below saturation by the electronic switch 67.

Usually the amplifier will be driven to saturation after the first cycle or compressional wave C. The attenuator 36 reduces the signal passed by the switch 67 to such an extent that the amplifier 76 is not driven to saturation by any of the signals passed through the electronic switch 67. An attenuation ratio of 6 to 1 has been found effective to achieve this result. The output from the amplifier 76 is transmitted to the surface equipment 23 for use in driving the measuring and recording equipment described more fully hereinafter. In addition, by providing another attenuator network like the fixed attenuator 36 between switch 70 and the first electronic switch 66, it will be possible to receive an attenuated signal (such as that identified as 35 in FIG. 3) from two of the detectors—15 and 16, 16 and 18, or 15 and 18—when the mode selector switch 70 is in one of the two receiver positions, as previously described. By conditioning the surface measuring equipment for velocity or interval time measurement as described in the aforesaid copending application Ser. No. 310,684, now Patent 3,303,461, it will then be possible to record an interval time log of the shear wave (when the shear wave is present) by measuring the arrival times of the first shear wave which is identified by the letter D on the waveform 35 in FIG. 3.

A self-potential electrode 93 is preferably carried by the cable 22 at a position spaced from the cable connector 21 for the purpose of gathering natural earth potentials in a manner which is well known in this art. The self-potential electrode is preferably connected via the cable conductor 24 to a set of self-potential measuring circuits 94 which drive a recorder 95. The recorder 95 may be of any conventional type and includes a recording medium driven simultaneously with the raising or lowering of the downhole tool 10 within the borehole as is indicated by the broken line 95a in FIGS. 1 and 2B so that the self-potential or natural earth potentials are recorded as a function of depth of the downhole tool. The synchronizing pulse and the output of the amplifier 76 appearing between the conductors 26 and 27 are used at the surface to develop either a conventional two-receiver velocity log, a SATA log of the type described above wherein a single-receiver amplitude curve is recorded simultaneously with a curve representing the difference in amplitude between signals arriving at the two active detectors, or a cement bond log wherein a single-receiver velocity log is recorded simultaneously with a single-receiver amplitude log. As was indicated above, the cement bond log can be produced only when the stepping switch 70 is in one of the single-receiver positions, while the other two logs can be produced only when the stepping switch is in one of the two receiver positions. The surface equipment is conditioned to provide the desired log by a manually operated mode selector switch having a number of switch sections 116, 117, 118, 119, 120, and 120a, each including a rotary arm movable to three different positions, namely, a "Satalog" position marked S, a "Velocity" log position marked V in FIG. 2, and a "Cement Bond" position marked C. Insofar as the present invention is concerned, it will be assumed that the switch is in the "Satalog" or S position and the operation in the other two switch positions will not be described. The surface equipment has been constructed to provide a first curve or log representing the amplitude of the compressional wave signal and a second curve or log representing the peak amplitude of the wave 35 arriving at the detector. To achieve these results, with the mode selector switch in the "Satalog" position, the stepping switch 70 is placed in one of its single-receiver positions to connect the same detector 15 to the electronic switches 66 and 67. This differs from the normal "Satalog" condition described in copending application Ser. No. 310,684 now Patent 3,303,461, in that two active receivers are required for a normal "Satalog."

At the surface the synchronizing pulse and the output of the amplifier 76 are applied to a coupling transformer 96 having its secondary connected to supply drive signals for a timing channel 97, a measuring channel 98, and an amplitude measuring channel 99. The timing channel 97 functions to gate both the amplitude measuring channel and the measuring channel 98 so that these channels are not triggered by spurious noises or the like and, hence, respond to signals arriving at the downhole detectors from the transmitting transducer 13. In addition, the timing channel 97 and the measuring channel 98 cooperate with the amplitude measuring channel to produce the compressional wave and maximum amplitude curves referred to above. More specifically, the output of the transformer 96 is applied across a gain control potentiometer 100 which is in turn connected to a first cathode follower 101 of conventional construction. The cathode follower isolates the channel 98 and the amplitude channel 99 from the timing channel and from the amplifier of the downhole tool. The output of the cathode follower 101 is applied across a gain potentiometer 102 which controls the magnitude of the input signal to the channel 98, and this output is also applied across an amplitude gain potentiometer 103 which controls the amplitude of the input signal to the amplitude measuring channel 99. The potentiometers 102 and 103 provide drive signals for a pair of amplifiers 104 and 105, respectively, of conventional construction. When running a single-receiver log the same detector is connected to the amplifier 76 during all cycles, but the output of the amplifier is alternately saturated (the waveform 76a) and attenuated (like waveform 35) during successive half cycles. The amplifier 105 provides drive signals for a pulse lengthener 106 and cathode follower 107 cooperating with a 1.5-millisecond shaper and gate 128 to provide a DC pulse for making the amplitude measurements. More specifically, the circuits 106 and 107 are identical to the similarly entitled circuits described in detail in the copending application Ser. No. 846,974 referred to above. Thus, the pulse lengthener 106 and cathode follower 107 are identical to the circuit identified in the copending application by the reference numeral 171 and shown in detail in FIG. 4 of the latter copending application.

The 1.5-millisecond shaper and gate 128 are effective to apply a very wide gate signal indicated at 128b in FIG. 3 to the pulse lengthener 106 and cathode follower 107 to develop a very wide DC pulse 106a and 106b having a width corresponding to that of the gate signal and having an amplitude proportional to the maximum or peak amplitude of the signals arriving at the detector 15 during the interval of the gating signal 128b.

The lengthened pulse output from the cathode follower 107 during all half cycles is applied through a large capacitor 110 to a load network 109. The large capacitor holds up the DC level for a long period during the wide gating intervals. The network 109 supplies drive signals for a pair of keyed rectifiers 111 and 112 when the mode selector switch is in the "Satalog" position. Each of these keyed rectifier circuits 111 and 112 is of the type identified by the reference numeral 32 in U.S. Patent No. Re. 24,446 and comprises a pair of triodes (not shown) for charging a storage capacitor 111a or 112a to a voltage proportional to the amplitude of the DC signal applied through the switch sections 116 and 117. If the amplitude of the DC drive signal is lower than the then existing voltage on the storage capacitor, one of the triodes conducts when the positive signal is applied to its grid so that the capacitor discharges to the lower level of the DC input signal. If, on the other hand, the DC input signal signal is greater than the voltage on the storage capacitor 111a or 112a, the other triode conducts when the positive signal is applied to its grid thus charging the storage capacitor to the higher voltage level of the input signal. The 50-microsecond positive pulse 113a supplied to the keyed rectifier 111 is derived from a blocking oscillator 113 while a similar signal 114a applied to the keyed rectifier 112 is derived from the blocking oscillator 114. These blocking oscillators are rendered effective during alternate half cycles in synchronism with the wide gate signals applied to the channel 99. Thus, during the half cycles when the electronic switch 66 applies signals to the amplifier 76 and the channel 99 DC pulses having a height proportional to the compressional wave amplitude, the blocking oscillator 114 is effective to drive the keyed rectifier circuit 112. During these half cycles the voltage appearing across the storage capacitor 112a is proportional to the amplitude of the pulse output of the cathode follower 107 and is applied to a first recorder drive 122 of a conventional oscillograph recorder which may include a plurality of recording galvanometers. One of the recording galvanometers or recording devices is identified by the reference numeral 121 and is controlled by the recorder drive 122 to deflect a light beam impinging upon a sensitized recording medium driven past the beam simultaneously with the raising or lowering of the downhole tool 10 within the borehole. The amount of deflection of the beam of the recording device 121 is proportional to the voltage across the storage capacitor 112a, and as a result, the device 121 develops a first continuous curve representing, as a function of borehole depth, the amplitude of the first negative excursion of the compressional wave arriving at the detector 15. The recorder drive 122 may also be used to control a recording pen or stylus acting upon a recording medium. If desired, the recorder drive may be calibrated in terms of attenuation in view of the fact that the amplitude of the detected signal is inversely proportional to the attenuation introduced by the earth formations or by the casing. By appropriate changes in polarities of the various circuits the recorder drive 122 could, of course, be made responsive to the amplitude of the first positive excursion of the detected signal.

During those half cycles when the electronic switch 67 applies attenuated signals to the amplifier 76 and the channel 99 develops wide DC pulses having a height proportional to the peak amplitude of the received signals, the blocking oscillator 113 is effective to drive the keyed rectifier 111. During these half cycles, the voltage appearing across the storage capacitor 111a is proportional to the peak amplitude of the largest signal in the received train, and this voltage is applied to a second recorder drive 144 which drives a recording device 145 which is preferably, but not necessarily, another recording galvanometer of the recorder described above. The latter recording galvanometer deflects another light beam impinging on the recording medium by an amount corresponding to the voltage across the capacitor 111a thus producing a continuous curve representing, as a function of borehole depth, the maximum or peak amplitude of the largest signal arriving at the detector 15.

Turning next to the timing channel 97, it will be observed that this channel comprises a sync gain potentiometer 123 for controlling the amplitude of the synchronizing pulse applied to a conventional synchronizing multivibrator 124 which develops a spike or pulse in response to the synchronizing signal from the downhole tool. The latter pulse triggers a multivibrator 125 of the type shown in U.S. Patent No. Re. 24,446 which, in turn, develops a square wave output for application to a saw-tooth generator and charging diode 126 and to a noise gate level circuit described more fully hereinafter. The duration of the square wave from the multivibrator 125 is equal to the measuring interval and is in excess of the time required for the acoustic energy to travel from the source 13 to the far receiver 18 even through formations having very low velocities of propagation. To this end, a 2-millisecond square wave is preferred. Preferably, the saw-tooth generator 126 is a conventional boot strap saw-tooth generator of the type described in U.S. Patent No. Re. 24,446 for producing a saw-tooth wave represented by the waveform 126a in FIG. 3 having its initial rise beginning with the synchronizing pulse and continuing to rise linearly throughout the 2-millisecond duration of the square wave from the multivibrator 125. When the saw-tooth reaches a predetermined amplitude it become sufficient to trigger a pick off control circuit 127 to develop a sharp timing spike or pulse indicated at 127a in FIG. 3 for triggering the blocking oscillator and multivibrator 108. One form of pick off control which could be used to perform the functions described is illustrated and described in the above-identified application Ser. No. 181,859, now U.S. Patent 3,295,628. Since the operation of this pick off circuit is believed to be obvious from the detailed description in the latter application, it suffices to say that the spike or triggering pulse for the blocking oscillator and multivibrator 108 is effective to cause the latter circuit to develop a 50-microsecond square wave 108a beginning at a time coincident with the spike from the pick off circuit, that is, at a predetermined time following the synchronizing pulse.

Considering next the operation of the measuring channel 98, it will be observed that this channel includes, in addition to the amplifier 104 referred to above, a gate circuit 128 of the type disclosed in U.S. Patent No. 2,862,104. The latter gate circuit is supplied with a square wave gating signal from the noise gate circuit, which preferably comprises a monostable multivibrator 130 of the type shown in U.S. Patent No. Re. 24,446. The multivibrator 130 is excited by the square wave output of a noise gate length multivibrator 129 which, in turn, is triggered by the square wave from the 2-millisecond multivibrator 125, but the latter square wave is first passed through a delay circuit 131 to delay the start of the signal for the multivibrator 130 for a fixed period following the synchronizing pulse. The delay circuit portion of the noise gate may be of the type identified by the reference numeral 25 in U.S. patent No. 2,768,701. The gated circuit 128 is nonconductive until it receives the square wave gating signal from the multivibrator 130 and, hence, during the delay period provided by the circuit 131 no signals are passed to the output terminals of the gated circuit 128. The gating signal from the multivibrator 130 has a duration of about 1.5 milliseconds, and signals detected during the 1.5-millisecond period are passed by the signal gate 128 which acts to develop at its output terminal signals of only one polarity, for example, negative going signals. The latter signals are passed to a pair of pick gain control potentiometers 132 and 133 connected in parallel. During these half cycles when the electronic switch 66 passes detected signals to the amplifier, the output of the potentiometer 133 is applied to an amplifier and cathode follower 134 of conventional construction, which, in turn, drives the blocking oscillator and multivibrator circuit 108. To effect this alternate operation, the saw-tooth output of the saw-tooth generator and charging diode circuit 126 is applied to a conventional bistable multivibrator 141 which is triggered once during each half cycle to change its operation from one conducting condition to the other. When the bistable multivibrator 141 is in the first of its two conducting conditions it is effective to pass current through the operating coil 135 of a cycle control relay having three contact sets 136, 137, and 140. The contact set 136 controls the input to the amplifier and cathode follower circuit 134 and, in the normal position shown in FIG. 2 with the relay coil 135 deenergized, the input to the amplifier cathode follower circuit 134 is derived from the potentiometer 133. The circuit arrangement of the multivibrator 141 is such that the relay coil 135 is deenergized during those half cycles when the electronic switch 66 is effective and is energized during those half cycles when the electronic switch 67 is active. When the relay coil 135 is deenergized the relay contacts 136 supply the amplifier and cathode follower circuit 134 with signals from the switch section 119. With the mode selector switch in the "Satalog" position the drive signal is taken from potentiometer 133 across which appears the output of the gate 128. The gate 128 is open during each half cycle for a 1.5-millisecond period equal to the duration of the gating signal from the multivibrator 130 beginning after the delay period introduced by the circuits 129 and 131. As was indicated previously, it is desirable that the 1.5 millisecond gate signal be delayed for a period almost equal to the travel time of the pulse from the transmitter 13 to the active detector 15. The potentiometers 142 and 143 adjust the duration of the square wave from the multivibrator 129 so that the 1.5-millisecond gate signal begins at the desired time during each half cycle. Thus, the settings of these potentiometers are determined to some extent by the spacing between the source 13 and the receiver.

During the half cycles when the relay coil 135 is energized the input to the amplifier and cathode follower 134 is derived from section 120a of the mode selector switch and, with the latter switch in the "Satalog" position, this input is the sharp spike or pulse developed by the pick off diode circuit 127. During these half cycles, the gate circuit 128 supplies a long gating signal of 1.5 milliseconds duration through a condenser 148 to the pulse lengthener 106. As will be apparent from an understanding of the above-identified copending application Ser. No. 846,974, the pulse lengthener 106 and cathode follower 107 produce an output pulse equal in duration to the 1.5-millisecond gate signal and proportional in amplitude to the maximum or peak amplitude of the largest signal supplied to the pulse lengthener from the amplifier 105 during the gating period.

With the mode selector switch in the "Satalog" position, the signal for the keyed rectifier circuits 111 and 112 are derived from the blocking oscillators 113 and 114 both of which are triggered from the output of a high gain amplifier 138. During these half cycles when the relay coil 135 is deenergized, the blocking oscillator 114 is, in effect, triggered by the signal appearing across the potentiometer 133 which, in turn, is derived from the signals arriving at the active detector 15. More specifically, during the half cycles when the compressional wave amplitude measurement is being made, the relay coil 135 is deenergized and the unidirectional signals appearing across the potentiometer 133 are applied through the contact set 136 to the amplifier and cathode follower 134. The signal output of the latter circuit triggers the blocking oscillator and multivibrator 108 to develop a pulse which is passed through the switch section 118, through the high gain amplifier 138, and through the contact set 137 to the blocking oscillator 114. The blocking oscillator 114 provides the drive signals for the keyed rectifier 112 to make the compressional wave amplitude measurement in the manner indicated above. In effect, the recorder drive 122 samples the voltage appearing across the capacitor 112a at a time coinciding with the application of a sharp spike from the blocking oscillator and the latter spike coincides in time with the negative excursion of the compressional wave.

During the half cycles when the relay coil 135 is energized, the relay contacts 137 supply the output of the high gain amplifier 138 to the blocking oscillator 113 which develops a signal for driving the keyed rectifier 111. During these half cycles the amplifier and cathode follower 134 are excited by the spike or pulse from the circuit 127 via switch section 120a. The blocking oscillator 113 is thus triggered to provide a signal for the keyed rectifier 111 beginning with the pulse or spike from the circuit 127. The keyed rectifier 111 samples the voltage across the capacitor 111a at this time and drives the recording device 145 accordingly in the manner described above. Thus, it will be observed that the recording devices 121 and 145 are excited alternately during successive rapidly recurring half cycles in order to provide simultaneously two continuous curves, one of which represents the amplitude of the compressional wave while the other represents the maximum or peak amplitude of the received signals.

During each half cycle, the oscilloscope 38, which may be a Tektronix type RM 504, produces a trace representing the signals passed by the amplifiers 76 and 104. The sweep of the oscilloscope is synchronized with the uphole equipment by the spike or pulse from the circuit 125 which triggers the sweep circuits of the oscilloscope to sweep the electron beam in the usual manner. The oscilloscope reacts instantly and has no moving parts. It is superior in response speed to other types of recorders such as galvanometers and, in addition, it permits a wide choice of time scales and vertical sensitivity.

To make a permanent record of the received signals for subsequent analysis, pictures are taken of the screen or face of the oscilloscope by a camera 39 of conventional construction preferably 16 millimeters. A light shield 40 may be interposed between the camera and the oscilloscope screen to facilitate the picture taking. The shutter of the camera may be opened at predetermined uniformly spaced time intervals or, in the alternative, pictures may be taken at predetermined borehole depths. More specifically, the camera shutter may be operated electrically from time signals derived from a time signal source 41 and passed through a manually operated switch 42, thus causing the camera to take pictures at uniform time intervals. Alternatively, the switch 42 may be used to supply the shutter control circuit with depth signals derived from a depth signal generator 43 driven in synchronism with the mechanism 29 for raising and lowering the downhole tool thus causing the camera to take pictures at uniformly spaced borehole depths, for example, every foot. In either case, each picture resembles the wave train 35 arriving at the detector during the period when the picture was taken. The pictures may be depth coded by photographing a mirror image of an odometer within the camera panel 39. Noise and/or cycle skipping may be readily discerned from the scope pictures and can be eliminated during subsequent plotting, a feat very difficult to accomplish electronically. Complete acoustic data can thus be obtained simultaneously with cement bond, velocity, or amplitude logs, and this data may be preserved through the pictures for future use.

Preferably the scope pictures are developed in the field to provide an on-site check on the reliability of any questionable log intervals. A preliminary field interpretation to locate hydrocarbons and fractured intervals and to evaluate fluid deliverabilities and cementing is standard field practice.

After preliminary field interpretations, the film may be delivered to the nearest office posssesing complete interpretation facilities. Here the image is projected on a large screen for manual measurement of wave characteristics. Individual print-out copies of the image may be made in a matter of seconds. The large screen image (32 power magnification) permits rather accurate plotting of acoustic wave trace parameters. Measurements can be made directly from either the screen or print-out.

Plot-outs may be made of interval times of the compressional waves or shear waves, compressional or shear wave frequencies, compressional wave amplitude, maximum wave amplitude, signal persistence, and total energy; however, additional plotouts are limitless.

Scope pictures and the plot-outs described above have been used to evaluate the following:

(1) *Location of hydrocarbons.*—In consolidated rock areas a clear and unmistakable relationship has been found between the presence of hydrocarbons and reduction of compressional amplitude.

In addition to the presence of hydrocarbons, lithologic changes, an increase in hole size, layering of dissimilar rocks and fracturing may also reduce the received signal amplitude. However, in unfractured consolidated rock, amplitude reduction because of the other mentioned variables may be predicted. Attenuation because of fractures is unpredictable and the direct location of hydrocarbons within a fracture is most difficult. However, fracture location is simple and, if the rock immediately adjacent to the fracture is porous, the contained fluids may be assumed to be similar to those in the adjacent rock.

Reduction in compressional amplitude because of hydrocarbons has been well established by the presence of cycle skipping in pay sections particularly gas, with the absence of skipping in all water zones exposed to the wellbore.

The fact that hydrocarbons are more compressible than water, possess different properties, and always exist as a member of a multiphase saturation of rock porosity—all contribute to compressional amplitude reduction. However, pore geometry, surface area of contact between oil and water, between water and internal rock surface, and between oil and internal rock surface will all control attenuation to some degree. The effects of formation water salinity and shale content have been found to be quite minor.

A unique feature of drilled formations capable of producing hydrocarbons is the hydrocarbon-water "boundary" created by mud filtrate invasion. Some amplitude reduction will be a result of boundary reflected energy arriving out of phase with the other energy being received. Also, acoustic waves doubtlessly arrive at the receiver by many paths, each successive path extending farther out into the formation. Because the acoustic velocity in the "hydrocarbon rich" path is lower than that in the "invaded fluid" path, destructive interference and further amplitude reduction may be expected opposite formations capable of producing hydrocarbons.

The presence of hydrocarbons as opposed to water has a relatively minor effect on the reduction of shear energy as compared to compressional energy. This is because all fluids act as insulators of shear energy. There can be, of course, a complex effect caused by transformation of compressional energy to shear energy and vice versa within the formation.

(2) *Permeability.*—Definite permeability-to-amplitude relationships exist for most rock types. For a given granular rock, as the grain size (permeability) increases, the number of grain contracts per given rock volume will decrease. With this decrease in surface area of coupling, we can expect greater signal attenuation and reduced amplitudes. Also, in hydrocarbon-bearing rocks (the only rocks of real interest to us) the geometry of oil and gas is commonly more favorable to signal reduction in the high permeability zones. In addition, rock consolidation and porosity will commonly decrease and increase respectively as permeability increases. Both degree of rock consolidation and porosity can be obtained from scope pictures.

Increasing porosity can be expected to increase attenuation, for there is commonly a decrease in the surface area of coupling with increasing porosity. A reduction in compressional amplitude will then accompany both increasing rock porosities and permeabilities.

(3) *Rock consolidation.*—Rock consolidation is related to rock type and age, degree of lithification, kind of porosity, and previous depth of burial. Acoustic properties vary greatly with consolidation. The more consolidated a rock, the higher the velocity; the higher the frequency of the first wave arrival, the greater the signal persistence and the greater the maximum amplitude.

Signal persistence may be defined as the time in microseconds from the first compressional arrival to the loss of all significant energy. It is related to a combination of formation ringing and the reciprocal of formation impedance. Signal persistence may be expected to increase with rock consolidation.

Frequency, or period of first compressional energy arrival, is a valuable indicator of rock consolidation and is included in each scope picture plot-out. The period of the first wave is used because it is relatively unaffected by multiples. Formations act as filters and selectively pass certain frequencies of energy. Frequency will commonly increase with increasing formation consolidation. In unfractured consolidated rock we can expect frequencies opposite limestone to be high, intermediate in sands, and low in shales. In unfractured rocks the frequency of first compressional arrival is quite uniform for a given rock type of similar productivity. To date, in sections that have been cored and analyzed, there is a strong correlation between increasing permeability and increasing period. However, in fractured reservoirs, because of accompanying phase shifting, the observed periods may deviate widely from the normal expected for the rock in question.

"Shear" amplitudes have also been used to indicate the degree of formation consolidation with brittle and consolidated formations being characterized by prominent shear waves. A remarkable correlation has been observed between maximum ("shear") amplitude and drilling time.

(4) *Granular Porosity.*—In vugular or fractured reservoirs the porosity distribution may be such that the first energy arrival will, by the main, travel through the non-vugular or "matrix" phase. The presence of unsymmetrical porosity may, however, be recognized because of the accompanying abnormally low energy arrival.

(5) *Location of Fractures.*—Fracturing, because of its almost negligible effect on rock porosity, has long eluded definition by conventional porosity logs.

Because of fracturing, rocks may have enormous permeabilities even though effective porosities and intergranular permeabilities may be near zero.

Aside from scattering caused by fractures, fractures reduce the acoustic coupling within the rock and may be identified by low amplitudes. Little energy is transmitted through "open" fractures because of the great difference between the rock and the fluids within the fracture. Fluid-filled open fractures create two additional interfaces with their associated energy absorption.

The presence of well cemented, or healed, fractures does not contribute to well productivity and is relatively unimportant to the analyst. Since the amount of sealant within a fracture controls the surface area of coupling, only minor amplitude reductions result from sealed fractures. Where displacement has caused the rock on either side of the fracture to be dissimilar, additional minor amplitude reduction may be expected.

The presence of a non-horizontal fracture, whether open or healed, will scatter some energy, causing phase shifting. Phase shifting is caused by the fracture's scattering strong energy into the borehole within the time of the first cycle. This energy, through constructive or destructive interference, commonly overcomes the first-arrival wave shape. First-cycle frequency then departs from that expected for an unfractured rock of the type under investigation. Vertical fractures also create a frequency interference pattern. To date, phase shifting because of vertical or nearly vertical fractures has been apparent on all plot-out logs where core analysis has definitely established the presence of this type of fracturing.

Amplitude losses caused by compressional energy passing through a diagonal fracture are commonly masked. Diagonal fractures may scatter considerable energy into the borehole.

The period curve or plot-out has been found to be most useful for locating fractures. Shear energy studies have proved best for evaluating fracture effectiveness. Fluid within fractures present an effective barrier to shear energy. Shear amplitude is then controlled by the surface area of coupling or openness of the fracture.

(6) *Cycle Skipping.*—Cycle-skipping is the failure of the first compressional energy cycle arriving at the second receiver to be of sufficient amplitude to actuate the measuring circuit. When this happens, the second cycle, which is generally higher in amplitude, will commonly trigger the electronic circuitry. The travel time as recorded on the log will then be too long by the time of one cycle divided by the distance between the two receivers.

Scope pictures clearly show all cycle-skipping and allow for the "editing out" of its effects.

(7) *Noise.*—Under certain adverse logging conditions, such as logging in gas cut mud, in irregularly caved or washed out wells, opposite "high attenuation" formations, and in small diameter and deviated holes, the received signal-to-noise ratio may be small. Noise will then become a problem, so serious at times that a satisfactory log cannot be obtained. When noise of sufficient amplitude arrives at the receiver prior to the first compressional energy, premature triggering of the measuring circuit occurs. This will result in recorded interval times that are greater than actual formation times. A single-receiver time curve, when presented in conjunction with a dual receiver log, will make both noise and cycle-skip errors obvious; but without a permanent recording of the total signal received, such as the scope pictures, accurate correction cannot be made.

In amplitude logging, noise may trigger the gate circuit, and the resulting galvanometer reading will then be a composite of formation and noise amplitude. Noise at any depth, unlike "fixed" incoming transmitter generated acoustic energy, is a random event. Noise does not arrive at either of the receivers in a fixed and repetitive pattern. This randomness of noise allows for its identification and elimination from scope picture plot-outs. The scope face phosphor has a memory of approximately one-half of a second. With 15 transmission pulses per second, several complete wave-train arrivals will appear on any one wave-trace picture. Very rarely has noise been observed to distort all of the sweep cycles. Since true signals will be a composite of several nearly identical sweeps, they will be reinforced and several times as intense as the noisy trace. Also, the true signal shape is predictable, arriving some time after transmission. Scope pictures then permit recognition of the noise and elimination of its effects with construction of a noise-free log.

(8) *Cement Bond.*—Acoustic scope pictures in cased wills offer much more information for evaluation of the quality of bonding than the conventional bond logs. Pictures supply information about cement-to-casing and cement-to-formation bonding in high as well as low velocity formations. The presence of bonding between cement and formation can readily be evaluated since the amplitude of the formation signal is proportional to the coupling between casing, cement and formation. No signal at expected casing arrival time will always mean good cement-to-casing bond. Where there is no signal at casing time, the amplitude of later arriving signals will shed much light on the quality of cement-to-formation bonding. Where formation and expected casing arrival are the same, a study of frequency has been used to establish the presence or absence of casing signal, casing signal frequency being uniform and lower than that for high velocity formations.

In addition to cement bond evaluation, where an excellent cemented and bonded conditions exists, picture studies have been used to determine lithology and porosity. Also, productions have been made of hydrocarbon-bearing zones behind the pipe.

In a recent study of eight wells logged in one district in Oklahoma using the techniques described above, the analysis proved 90 percent correct in that production was accurately predicted and obtained. Many of these producing wells had previously been logged by prior art techniques which indicated no production. Thus, the present invention has produced truly outstanding results in the field in facilitating the correct analysis of the subsurface formations.

While the invention has been described in conjunction with an illustrative embodiment, it will be understood that many modifications would readily occur to those skilled in this art and it is, therefore, contemplated by the appended claims to cover any such modifications as fall within the true spirit and scope of the invention.

What is claimed as new and desired to be secured by Letters Patent of the United States is:

1. In an acoustic well logging system of the type utilizing a source of pulsed acoustic waves for transmission through earth formations surrounding a borehole to receiving means fixedly spaced from said source in a direction extending longitudinally of the borehole, said receiving means developing a train of AC electric energy in response to each pulse from said source, the improvement which comprises first and second receiving channels excited by the trains of energy detected by the receiving means, first signal developing means in said first channel for developing first signals proportional in amplitude to the peak amplitude of the first cycle only of the train of energy, first recording means connected to said first channel for recording said first signals to produce a first curve representing the peak amplitude of the first cycle of the train of energy as a function of borehole depth, second signal developing means in said second channel for developing second signals proportional in amplitude to the maximum amplitude of all of the signals of the train, means for rendering the channels alternately operative in synchronism with the transmission of pulses from said source, said first signal developing means including a gate circuit opened for a narrow interval approximately equal to the width of said first cycle in response to the initial arrival of the acoustic waves at the receiving means, the first signal developing means being effective during said narrow interval to develop said first signals, said second signal developing means including a gate circuit opened for a period much greater than said narrow interval, and said second signal developing means being effective during said period to develop said second signals, and second recording means connected to said second channel for recording said second signals simultaneously with said first curve to produce a second curve representing the maximum amplitude of all of the signals of the train as a function of borehole depth.

2. The apparatus defined by claim 1 wherein said first and second recording means includes switching means for rendering them alternately operative in synchronism with the pulses from the source.

3. In an acoustic well logging system of the type utilizing a source of pulsed acoustic waves for transmission of acoustic pulses through earth formations surrounding a borehole to receiving means fixedly spaced from said source in a direction extending longitudinally of the borehole, said receiving means developing a train of AC electrical energy in response to each of the pulses from said source, the improvement which comprises first signal developing means responsive to the electrical energy for developing first signals proportional in amplitude to the peak amplitude of the first cycle only of the train, second signal developing means responsive to the electrical energy for developing second signals proportional in amplitude to the maximum amplitude of all of the signals of the train, recording means excited by the first and second signals for producing a first curve representing the peak amplitude of the first cycle of the train of energy as a function of borehole depth and a second curve representing the maximum amplitude of all of the signals of the train as a function of borehole depth, said first signal developing means including a gate circuit opened for a narrow interval approximately equal to the width of said first cycle in response to the initial arrival of the acoustic waves at the receiving means, said first signal developing means being effective during said narrow interval to develop said first signals, said second signal developing means including a gate circuit opened for a period much greater than said narrow interval, said second signal developing means being effective during said period to develop said second signals, and means for rendering said first and second signal producing means alternately effective in synchronism with the transmission of said acoustic pulses.

4. In an acoustic well logging system of the type utilizing a source of pulsed acoustic waves for transmission through earth formations surrounding a borehole to receiving means fixedly spaced from said source in a direction extending longitudinally of the borehole, said receiving means developing a train of AC electrical energy in response to each of the pulses from said source, the improvement which comprises first signal developing means responsive to the electrical energy for developing first signals proportional in amplitude to the peak amplitude of the first cycle only of the train, second signal developing means responsive to the electrical signals for developing second signals proportional in amplitude to the maximum amplitude of all of the signals of the train, said first signal developing means including a gate circuit opened for a narrow interval approximately equal to the width of said first cycle in response to the initial arrival of the acoustic waves at the receiving means, said first signal developing means being effective during said narrow interval to develop said first signals, said second signal developing means including a gate circuit opened for a period much greater than said narrow interval, and said second signal developing means being effective during said period to develop said second signals, and recording means excited by said first signals for simultaneously producing a first curve representing the amplitude of said first cycle as a function of borehole depth and a second curve representing the maximum amplitude of all of the signals of the train as a function of borehole depth.

5. The apparatus defined by claim 4 wherein means are provided for rendering the first and second signal developing means alternately operative in synchronism with the transmission of pulses from said source.

6. The apparatus defined by claim 4 wherein means are provided for rendering the recording means alternately effective to develop respective portions of said first and second curves.

7. The apparatus defined by claim 5 wherein means are provided for rendering the recording means alternately effective to develop respective portions of said first and second curves.

References Cited
UNITED STATES PATENTS

| | | | |
|---|---|---|---|
| Re. 25,928 | 12/1965 | Geyer et al. | 181—.5 X |
| 2,651,027 | 9/1953 | Vogel | 340—18 |
| 2,708,485 | 5/1955 | Vogel | 340—18 X |
| 2,813,590 | 11/1957 | McDonald | 181—.5 |
| 2,956,635 | 10/1960 | Summers | 181—.5 |
| 3,148,352 | 9/1964 | Summers | 340—18 |
| 3,182,744 | 5/1965 | Vogel | 340—18 |
| 3,212,598 | 10/1965 | Anderson | 340—18 X |
| 3,212,601 | 10/1965 | Summers | 340—18 X |
| 3,252,131 | 5/1966 | Vogel | 340—18 |
| 3,265,151 | 8/1966 | Anderson | 340—18 X |
| 3,303,461 | 2/1967 | Edwards et al. | 181—0.5 X |

FOREIGN PATENTS

| | | |
|---|---|---|
| 244,298 | 1/1961 | Australia. |

BENJAMIN A. BORCHELT, *Primary Examiner.*

R. M. SKOLNIK, *Assistant Examiner.*